(No Model.)
J. EMERY.
COMBINATION TIRE INFLATING PUMP AND BICYCLE SUPPORTER.
No. 581,107. Patented Apr. 20, 1897.
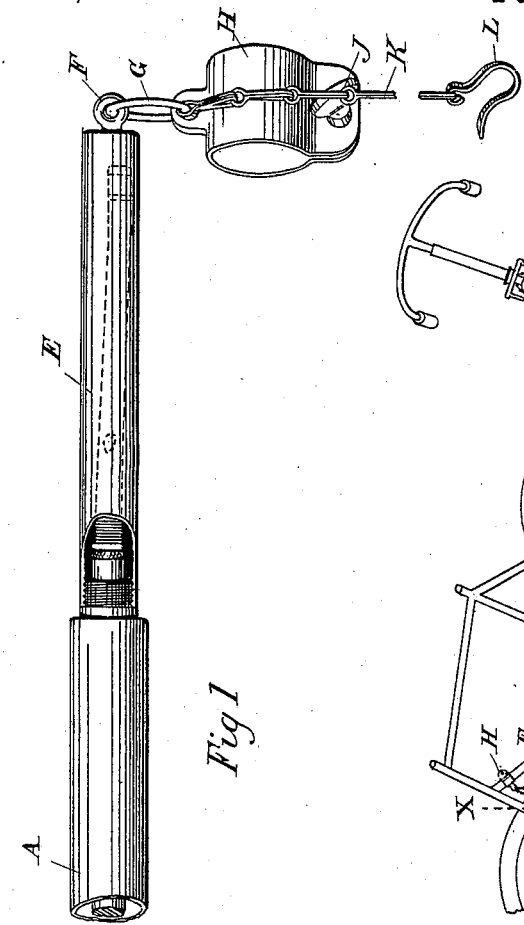
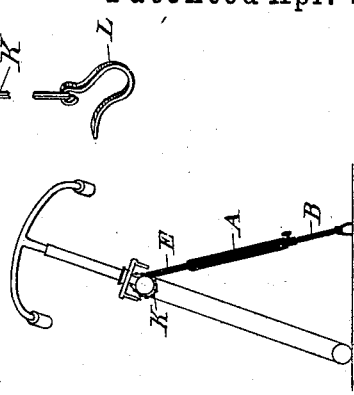
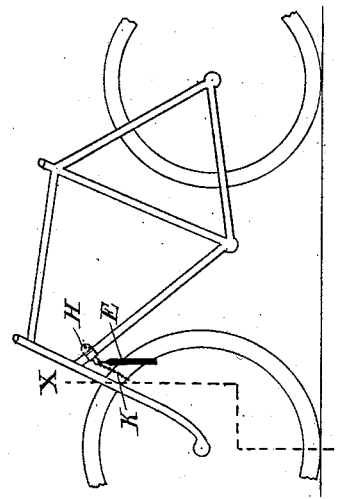
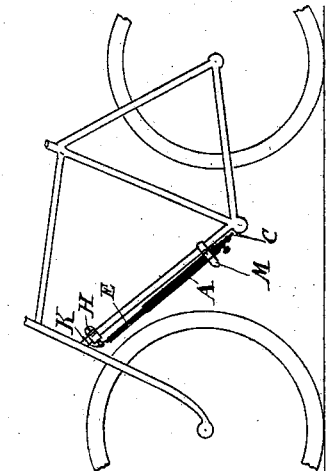
Witnesses:
Inventor:
John Emery
By his Attorney

UNITED STATES PATENT OFFICE.

JOHN EMERY, OF BRUNSWICK, VICTORIA.

COMBINATION TIRE-INFLATING PUMP AND BICYCLE-SUPPORTER.

SPECIFICATION forming part of Letters Patent No. 581,107, dated April 20, 1897.

Application filed April 18, 1896. Serial No. 588,142. (No model.)

*To all whom it may concern:*

Be it known that I, JOHN EMERY, paper merchant, a subject of the Queen of Great Britain and Ireland, and a resident of 86 Lygon Street, Brunswick, in the county of Bourke, Colony of Victoria, have invented a certain new and useful Combination Tire-Inflating Pump and Bicycle-Supporter, of which the following is a specification.

The object of my invention is to provide an attachment to the pneumatic-tire-inflating pump of a bicycle and to the bicycle itself, whereby the said pump is not only used for the inflation of tires, but also by a slight adjustment of its parts as a support for the bicycle when there is nothing to lean it against.

Hitherto on dismounting from a machine in an open space it has been necessary to lay it on its side upon the ground, but with my invention one end of the pump is detachably connected to the frame of the machine and the other is released from the said frame and swung out till it rests upon the ground. The result is that the bicycle carries in its own inflating-pump a support which is always ready at hand and which adds very little, if anything, to the traveling weight of the machine.

My invention consists of a tire-inflating pump of the familiar elongated cylinder-type, to the discharge end of which (and over the flexible tube) is attached a tubular extension. Through a hole outside the end of this is inserted a ring, (hereinafter called the "intermediate" ring,) which also passes through a hole in a clip attached to the bottom front tubular stay of the diamond frame of the machine or through an eyehole fixed thereto. To the intermediate ring is connected a piece of chain with an open hook on its end, which chain is to be placed round the rim of the wheel and to lock it. In order to secure a better contact with the ground, the handle on the end of the piston-rod is forked, while the said rod, with its forked end, can be locked at any distance from the cylinder end by a thumb-screw on the side of the cylinder.

Referring to the drawings which form a part of this specification, similar letters of reference indicate similar or corresponding parts where they occur in the several views.

Figure 1 represents an enlarged view of the pump with the tubular extension and the ring and clip by which it is fixed to the machine, though, as before said, the intermediate ring may be inserted into an eyehole integral with the bottom stay. The chain shown, which can be dispensed with in some machines, is for surrounding the rim and locking the wheel. The dotted lines inside the tubular extension indicate the flexible connection which is to be coupled to the inflating-tube inside the bicycle-rim. The portion of the tubular extension which is broken away discloses one way in which it may be connected to the pump and also the connection of the flexible tube to the pump. Fig. 2 represents a view of a bicycle-frame with the pump (in full black lines) secured in place and ready for the road. Its handle end may be secured by a leather strap or by a spring-clip. Fig. 3 shows (in full black lines) the position of the attachments—*i. e.*, the tubular extension, the intermediate ring, and clip—when the pump, having been removed from the machine, is being used for the inflation of the tire. As will be seen, the chain is twisted round the rim of the steering-wheel and the extension-tube lies against the side of the tire. Fig. 4 represents a front view of the machine, looking at it beyond the dotted line X X, Fig. 3. The pump (in full black lines) is here shown as coupled to the tubular extension and its connections and is acting as a support for the bicycle which leans against it.

On reference to the drawings, A represents the pump, and B its piston-rod, to the end of which is attached the handle C.

Both the pump and rod and other connections may be of any metal or material, and the handle is forked, as shown in Fig. 1, or otherwise provided with one or more prongs or projections, with the object of its obtaining a more secure hold on the ground when it takes the leaning weight of the machine. The thumb-screw D is connected to the pump-cylinder A and is for locking the piston-rod B in any suitable position lengthwise, and its inner end may be upset sufficiently to prevent its falling out on the road should it happen to work loose through vibration.

The tubular extension E, which covers the flexible connection O, may be connected to the pump-cylinder end by a screw-thread, as shown, or the end of the tube may be split and pushed over the cylinder end and locked, if necessary, by a thumb-screw. Through the hole F in the end of the tubular extension E is inserted the intermediate ring G, which also passes through a hole in the clip H. This clip is sprung over the bottom front tubular stay of the diamond frame of the machine and is there locked by the thumb-screw J in any suitable position.

The chain K, which may be of any suitable description, has one end attached to the ring G and at the other end is a hook L, though obviously a lock may be substituted for said hook.

The manner in which my combination is employed is as follows: The cyclist requiring to use his pump for the inflation of the tire opens the strap M. (Shown in Fig. 2.) Then if the tubular extension is screwed to the pump-cylinder he holds the said extension in his left hand and with his right unscrews the pump-cylinder from it. When unscrewed, (or pulled apart, if the end of the extension-tube is simply split or locked by a thumb-screw,) he lets the tubular extension fall against the tire and uses the pump for the purpose of inflating. Should he want the machine to stand by itself when he has completed this operation, he again connects the pump to the tubular extension and letting the bicycle lean toward the side on which the pump is situated allows the piston-rod to fall out from the cylinder till the forked end touches the ground. He then locks the rod by the thumb-screw D and the machine is left standing in safety, as shown in Fig. 4.

Having now described my invention, what I claim as new, and desire to secure by Letters Patent, is—

1. A support for bicycles consisting in the combination of a tire-inflating pump, and a shield for the flexible connection thereof provided with means for attachment to the bicycle.

2. A support for bicycles consisting in the combination of a tire-inflating pump, an adjustment device for fixing the piston thereof at different positions in its throw, a removable shield for the discharge end of the pump provided with an attachment for fixing it to the frame of the bicycle, and means for temporarily securing the other end of the pump to said frame.

3. As an article of manufacture, an inflating-pump, securing prongs or projections formed on the handle of its piston, a set-screw attached to the cylinder of the pump to fix the piston at different positions of adjustment, a cover for the inflating end of the pump, and a suitable device connected thereto for attachment to a bicycle.

In witness whereof I have hereunto set my hand in presence of two witnesses.

JOHN EMERY.

Witnesses:
EDWIN PHILLIPS,
CECIL WOODS LE PLASTRIER.